United States Patent [19]

Warren et al.

[11] Patent Number: 5,632,022

[45] Date of Patent: May 20, 1997

[54] ENCYCLOPEDIA OF SOFTWARE COMPONENTS

[75] Inventors: Lloyd V. Warren, Pasadena; Brian C. Beckman, Sunland, both of Calif.

[73] Assignee: The United States of America as represented by the Administrator of the National Aeronautics and Space Administration, Washington, D.C.

[21] Appl. No.: 792,501

[22] Filed: Nov. 13, 1991

[51] Int. Cl.$^6$ .............................. G06F 15/00; G06F 3/00; G06F 9/45

[52] U.S. Cl. .......................... 395/350; 395/762; 395/702; 395/968

[58] Field of Search ..................... 395/155, 156, 395/157, 158, 159, 160, 161, 922, 350, 762, 702, 968

[56] References Cited

U.S. PATENT DOCUMENTS

| | | | |
|---|---|---|---|
| 4,476,528 | 10/1984 | Matsumoto et al. | 395/601 |
| 4,558,413 | 12/1985 | Schmidt et al. | 395/619 |
| 4,622,633 | 11/1986 | Ceccon et al. | 395/651 |
| 4,631,664 | 12/1986 | Bachman | 395/611 |
| 4,734,854 | 3/1988 | Afshar | 395/700 |
| 4,813,013 | 3/1989 | Dunn | 395/333 |
| 4,860,204 | 8/1989 | Gendron et al. | 395/702 |
| 4,974,160 | 11/1990 | Bone et al. | 395/161 |
| 5,123,103 | 6/1992 | Ohtaki et al. | 395/600 |

OTHER PUBLICATIONS

Maarek et al., "An Information Retrieval Approach for Automatically Constructing Software Libraries", IEEE Transactions on Software Engineering, vol. 17 No. 8 (Aug. 1991) pp. 800–813.

Di Fehce et al., "An Interaction Environment Supporting the Retrievability of Reusable Software Components", IEEE Computer Society Press, Tenth Annual International Phoenix Conference on Computers and Communications (Mar. 1991), pp. 287–293.

Wood et al., "An Information Retrieval System for Software Components", Software Engineering Journal, vol. 3 No. 5 (Sep. 1988) pp. 198–207.

Jones et al., "Building and Managing Software Libraries", IEEE Computer Society Press, Proceedings COMPSA 88: The Twelfth International Computer Software and Applications Conference (Oct. 1988), pp. 228–236.

Latour et al., "Seer: A Graphical Retrieval System for Reusable Ada Software Modules", IEEE Computer Society Press, Third International IEEE Conference on Ada Applications and Environments (May 1988) pp. 105–113.

*Primary Examiner*—Mark K. Zimmerman
*Assistant Examiner*—Joseph R. Burwell
*Attorney, Agent, or Firm*—John H. Kusmiss; Thomas H. Jones

[57] ABSTRACT

Intelligent browsing through a collection of reusable software components is facilitated with a computer having a video monitor and a user input interface such as a keyboard or a mouse for transmitting user selections, by presenting a picture of encyclopedia volumes with respective visible labels referring to types of software, in accordance with a metaphor in which each volume includes a page having a list of general topics under the software type of the volume and pages having lists of software components for each one of the generic topics, altering the picture to open one of the volumes in response to an initial user selection specifying the one volume to display on the monitor a picture of the page thereof having the list of general topics and altering the picture to display the page thereof having a list of software components under one of the general topics in response to a next user selection specifying the one general topic, and then presenting a picture of a set of different informative plates depicting different types of information about one of the software components in response to a further user selection specifying the one component.

26 Claims, 14 Drawing Sheets

ENCYCLOPEDIA OF SOFTWARE COMPONENTS

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention is related to software development and engineering tools which increase software design productivity.

2. Background Art

A high fraction of the time spent developing new software systems is spent performing mundane functions that are well known in the art. By comparison, when a mechanic goes to make a new device, he does not reinvent mundane pieces, such as the threaded screw. The same cannot be said of software engineers. Software engineers have long identified the need for convenient, easy-to-learn, intuitive software reuse systems to support rapid prototyping.

Software development is a tedious, expensive, time-consuming, and error-prone process. Approaches to improving the process include object-oriented programming, computer-aided software (CASE), software reuse, formal mathematical verification, structured walkthroughs, formal testing regimens, and so on.

Most hardware artifacts are constructed from standard parts fitted together with standard fasteners. Custom parts and fasteners are used only when their much higher cost can be justified. Using standard parts not only makes replacement easier but also amortizes the cost of design, engineering, and tooling across large production runs, often spanning decades of time.

The analogy in software to the use of standard parts in hardware is the reuse of previously developed software code, modules, libraries, designs, architectures, documentation, test data, test routines, test strategies, and so on. All of these information artifacts, and more, are software in the sense that they are directly related to the production and use of computer instructions. We use the term "software" in this broad sense in this paper.

One reason software is expensive is that, for the most part, we do not amortize the cost or development by reusing components in new applications. Software is still, by and large, a craft process characterized by the custom design and fabrication or components. The lack of software reuse is especially ironic since economies of scale are easier to achieve in software than in hardware. The reason is that software is mere information and, therefore, massless. Replicating and distributing it is relatively inexpensive (a major cost driver in hardware industries is the mass of the objects being produced). One would think, on the face of it, that an industry that could achieve economies of scale relatively easily would eagerly do. Yet, we have not seen the "Software Industrial Revolution".

Many reasons have been advanced for the failure of the software industry to adopt a standard component parts technology. Perhaps the most plausible reason is that it often takes more effort merely to research existing software components than to develop them anew. In other words, many software developers-potential consumers of reusable software-simply find it more cost-effective to invent new software than to look for old software.

The only discipline in which software component reuse is traditional is computational mathematics. This is at least partly due to the fact that it requires a great deal of specialized knowledge and experience to write correct and efficient mathematical software. It is, in fact, for non-specialists, not easier to reinvent than to reuse. We find it interesting that the majority of mathematical software—the most reused software—is written in Fortran. Of all major programming languages, Fortran is perhaps the least hospitable, prima facie, to software reuse. It has virtually none of the packaging and information-hiding features that conventional wisdom deems helpful, if not necessary, for reusability. We take this fact as supporting evidence in favor of our consumer-side approach to software reuse, as opposed to a producer-side approach that posits basic changes in the way software is written as a precondition for reuse. People will reuse software, even if that software is not written for maximum reusability, if it is easier for them to reuse than to reinvent.

One prior attempt at making software retrievable is disclosed in U.S. Pat. No. 4,860,204 to Gendron et al. In this patent, software components called softrons are created in a single language and stored in a file cabinet metaphor, rather than using existing software components of any language. A particular softron is accessed in response to a user's selection of relevant software attributes. However, there is no disclosure of any means for permitting the user to first view the attributes and other characteristics of the accessed softron before incorporating it in a program under construction, absent external means of some sort. Gendron et al. therefore have nothing to do with attempting to reuse existing software, but rest their concept on creating a complete set of software components in a single language.

OBJECT OF THE INVENTION

It is the principal object of the invention to make it easier to reuse than to reinvent software. We can achieve maximum impact by focusing on consumer issues: by trying to make it easier to reuse software in general. We feel that the process that a potential consumer of reusable software components must go through consists of the following steps:

locating, understanding, retrieving, validating, and adapting existing software. We call this process LURVA, an acronym constructed from the first letters or each or the five steps. This is in concert with other, published task analyses of software reuse.

We focus on facilitating LURVA in a very general way to make it easier to reuse software in general. By software in general, we mean software in any programming language, for any application domain, for any platforms, etc.

A related object of the invention is to directly aid locating, understanding, and retrieving, the first three steps of LURVA. In the invention, an encyclopedia of software components (ESC), locating is facilitated through a very general classification scheme, based on semantic networks, and through tying this scheme closely to a hypermedia browsing-and-searching front end. Understanding is facilitated by describing software with electronically cross-linked text, graphics, animation, audio, video, and typeset mathematics, i.e., hypermedia. Retrieving is facilitated by encapsulating knowledge about network access along with the descriptions of software and by automatically computing closed sets of software items that enable a chosen time to be used as an independent unit or a component.

The invention was developed with the following assumptions:

Many programmers and managers feel that the effort of reusing software is greater than the effort of writing software from scratch.

The balance is tipped in favor of reuse for mathematical software because this software is inherently difficult to write and because there is a long radiation of reusing this kind of software.

We do not need to wait for fundamental shifts in the way software is produced before trying to tip the balance in favor of reuse for general software. We can promote reuse now by simply encapsulating, automating, and distributing knowledge about how to reuse.

The LURVA process accounts for most of the cost of software reuse on the consumer side.

Maximum, short-term leverage to facilitating LURVA can be applied by automating the locating, understanding, and retrieving (LUR-) steps. Even if programmers must validate and adapt (-VA) components manually, they will find the total effort less than that of reinventing.

There exist vast numbers of accessible and reusable software artifacts now, mostly on distributed network nodes.

Programmers are especially eager to reuse their own software and to make it accessible and reusable by other programmers (the urge to publish).

If we can make it easy for programmers to submit their own software for consideration for inclusion in the ESC, we create an automatic growth mechanism for the ESC by capitalizing on the urge to publish.

Finally, programmers will want to reuse the mechanisms of the ESC itself to make hypermedia front ends for special-purpose, local collections of software in the broadest sense of the word (designs, architectures, test data, etc.)

The foreseeable effects of the invention are the following:

most impact: The standard practice of programming is changed so that reuse is almost always attempted before reinvention. The habit of pulling software off networks by consulting an on-line, comprehensive, international ESC becomes commonplace. Furthermore, the job category of software technician is created. A software technician is one who fabricates software by assembling specified, standard parts without profound knowledge of the working of these parts. Programmers are freed from routine assembly to devote themselves to design.

moderate impact: The ESC proves to be a valuable programmer's tool. At the very least, it helps to teach programmers to document, classify, and reuse their own software. Requirements for improvements on the structure and contents of the ESC result from the research program.

SUMMARY OF THE INVENTION

The invention is a computer system embodying an encyclopedia of software components (ESC) which stores a large compendium of reusable software components with a hypermedia browser system consisting of an encyclopedia metaphor at the highest level corresponding to the compendium and a tray metaphor at the lowest level corresponding to each software component. In the tray metaphor, each software component is in its own "tray" containing several plates corresponding to different representations of the software component (including graphical and animated representations in appropriate cases), the attributes of the software component, utilities associated with the software component, etc. The invention further includes a search system employing the tray metaphor which searches on selected attributes stored in the attributes plate of each tray.

ESC enables the convenient and intuitive location and retrieval of reusable software tools and parts through a graphical hypertext user interface. Hypermedia is a term for information systems that can depict animation, audio, text, and graphics.

The software developer first locates the general category of books in which he is interested, then he scans the book, as if it were a standard reference work, to determine which pre-existing software components will solve his immediate development needs.

Using this scheme, existing software packages can simply be referenced and copied into the developer's program. With ESC, the developer is free to concentrate on those portions of his program that are unique to his particular effort and requiring novel solutions. In other words, his development procedure will now be more like that of the mechanic who makes a new device by connecting existing pieces to new pieces.

This approach should permit truly rapid prototyping, greatly reduce the cost of software development, increase the speed of development, and ensure greater robustness in the resulting prototype.

ESC permits an endless series of software reference books to be created, just as a library can hold a nearly limitless collection of books. In fact, software developers are allowed to create reference books themselves and place them in the ESC library.

One embodiment of ESC supports rapid prototyping in an application prototyping environment.

In its current version, there are various software components residing in the ESC. For design purposes these can be divided into two groups. Group one components are subroutines, functions, procedures and objects with a minimum of entanglements and external dependencies. Group one components live at the language cell level of use. They are small, well abstracted modules of functionality easily incorporated into larger programs. The group two components tend to be larger, stand-alone applications that live at the executive or shell level of use. Examples of these are screen editors and system utilities.

Future embodiments of ESC will include advanced media technology, including voice and video, and will link ESC to a database management system (DBMS). The new media will allow developers to experiment with non-textual communication of information about software, such as computer animation and recorded verbal descriptions. Integrating ESC with a DBMS will allow very large tool bases to be handled and will facilitate technology transfer.

Yet another embodiment of ESC includes a graphical hypertext feature called HyperCode. HyperCode will allow a programmer not only to retrieve software, but to modify it, execute it, and cross-link it with other software using interactive graphics and hypertext.

DETAILED DESCRIPTION OF THE INVENTION

Introductory Overview:

The ESC uses hypermedia front ends for subsystems that classify, catalog, retrieve, and display information about large, structured collections of reusable software. The ESC concentrates information about software; the software itself is on local and distributed repositories, e.g., networks, archive servers and bulletin boards. Among the features of the ESC are a metaphor of an encyclopedia at the highest level (shown in FIG. 1) and a metaphor of a tray of informative plates at the lowest (software component) level in a hypermedia context. In addition, an automated subsystem can add not only new entries but new software classification structures.

Figure 2:
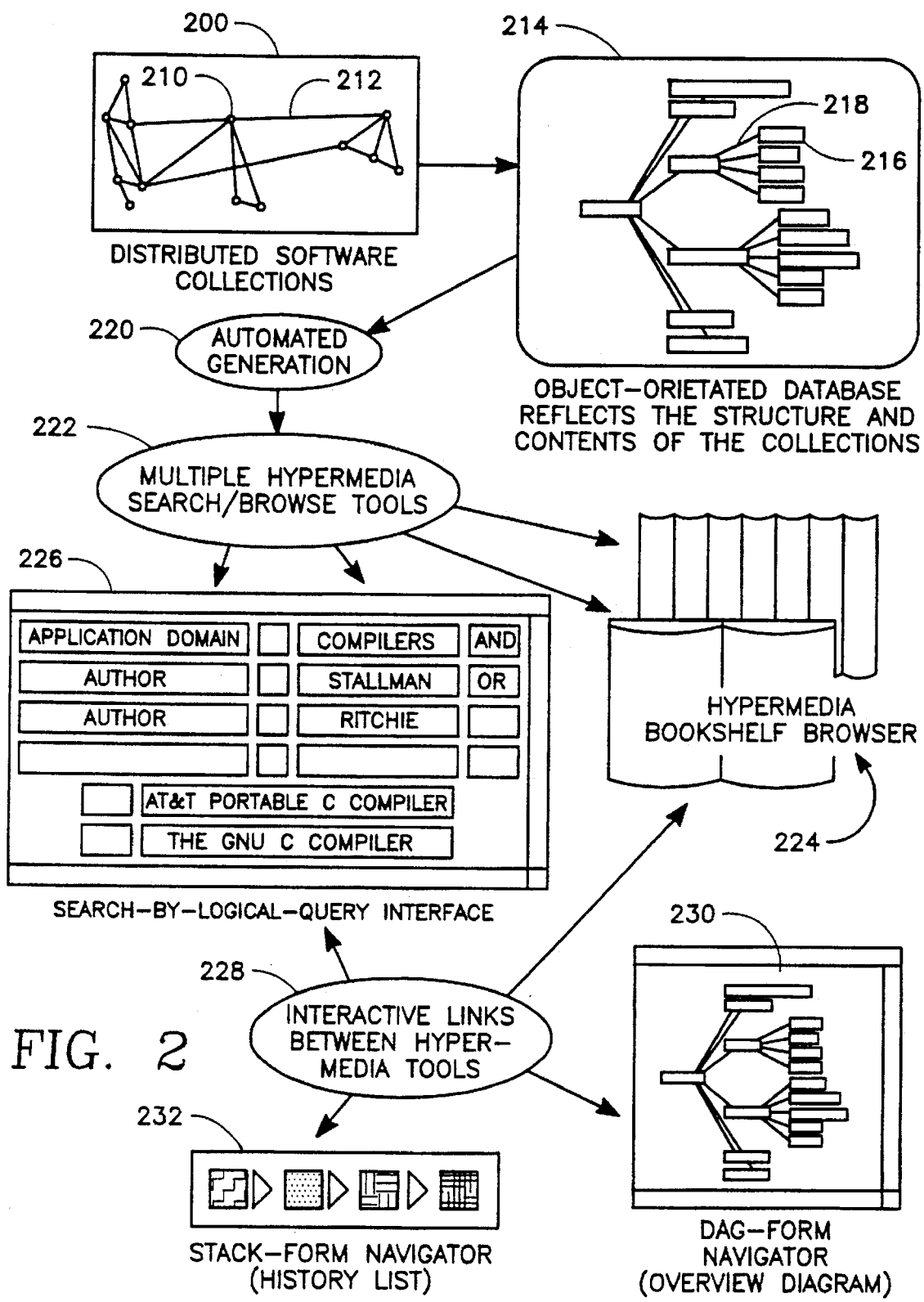
FIG. 2 is a graphical flow diagram representing the operation of the invention.
Figure 3:
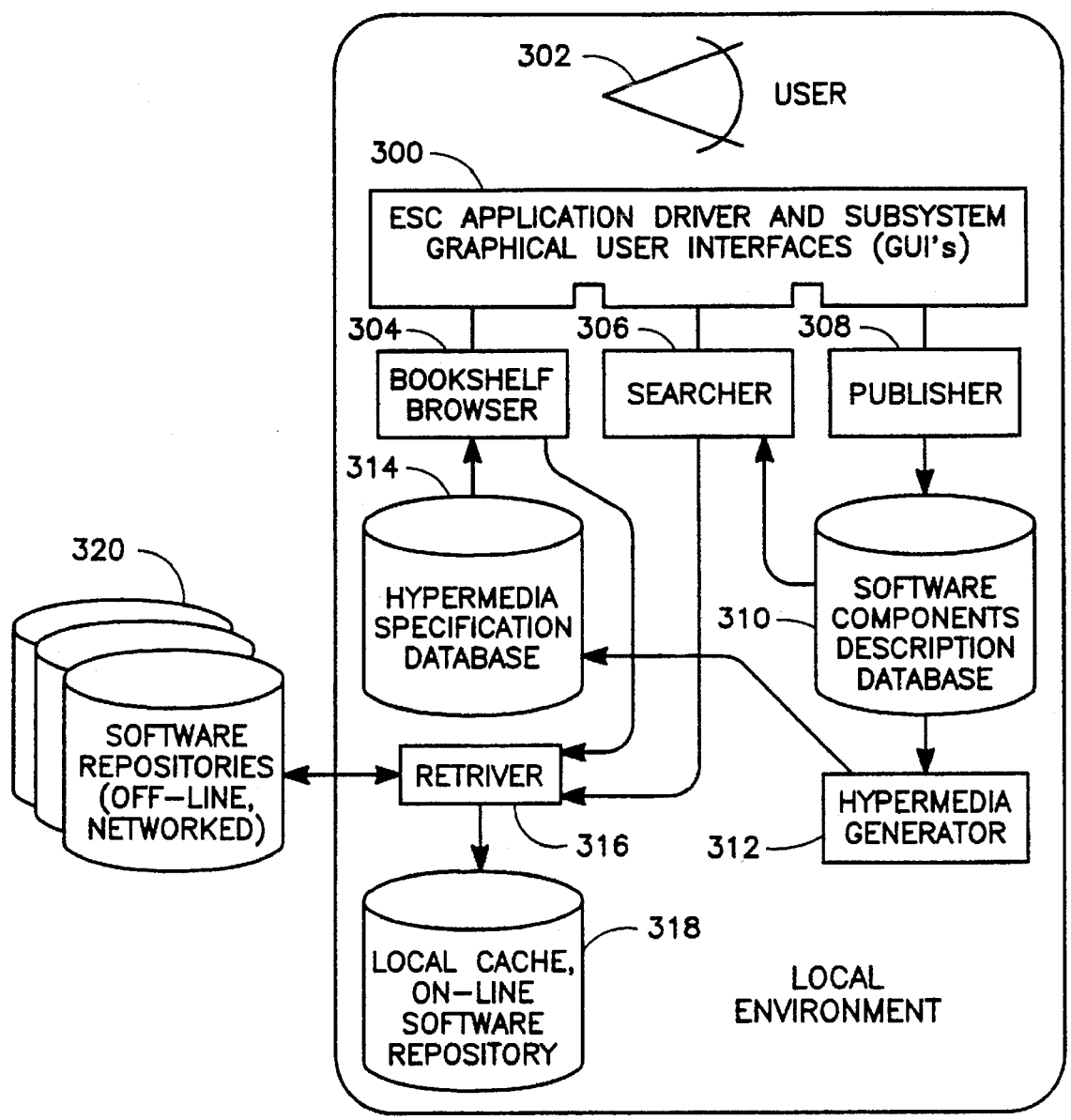
FIG. 3 is a simplified schematic block diagram of a computer system embodying the invention.

The architecture of the ESC is illustrated informally in FIG. 2 and schematically in FIG. 3. The informal illustration of FIG. 2 shows the subsystems of the ESC iconically, emphasizing the graphical appearance of each element on the user's video monitor screen. The schematic of FIG. 3 is a more formal rendition of the subsystems of the ESC and the data and control flows among the subsystems.

In FIG. 2, the invention provides a video display 200 of a topological graph of distributed software collections, each group of software being a point 210 whose relations with other groups are indicated by connecting lines 212. The display can be translated to another video display 214 which illustrates the same relations in an object oriented database.

In the video display 214, each software group is a block 216 which flows from more generic groups and branches into more specific groups from left to right in FIG. 2 along connecting lines 218. The invention automatically generates (220) from the information represented by the object oriented database display 214 multiple hypermedia search and browse tools (222) consisting of a video display 224 of an encyclopedia metaphor comprising a bookshelf browser tool and a video display 226 of a logical search-by-inquiry interface comprising a search tool. The video display 226 consists of topical lists of software components having attributes corresponding to those specified by the user. Interactive links 228 between these tools provides navigation tools consisting of an overview navigator video display 230 and a history list navigator video display 232. Each of the navigation tool video displays 230, 232 illustrates to the user the history of his activity in searching or browsing among various software topics.

In FIG. 3, a computer system embodying the invention is briefly summarized as including an application driver 300 having graphical user interfaces (GUI's) which provide to the user 302 the video displays illustrated in FIG. 2. The application driver 300 interfaces with a bookshelf browser 304, a searcher 306 and a publisher 308. The publisher 308 is the source of a software components description database 310 which provides the search-by-logical query interface display (226 in FIG. 2) of the searcher 306. A hypermedia generator 312 generates the display of the metaphor of the encyclopedia bookshelf (224 in FIG. 2) comprising the highest level of the hypermedia specification database 314 used by the browser 304. A retriever 316 responds to requests from both the browser 304 and the searcher 306 to retrieve software components finally selected by the user 302 from either a local repository 318 or from remote off-line or networked repositories 20.

Figure 1:
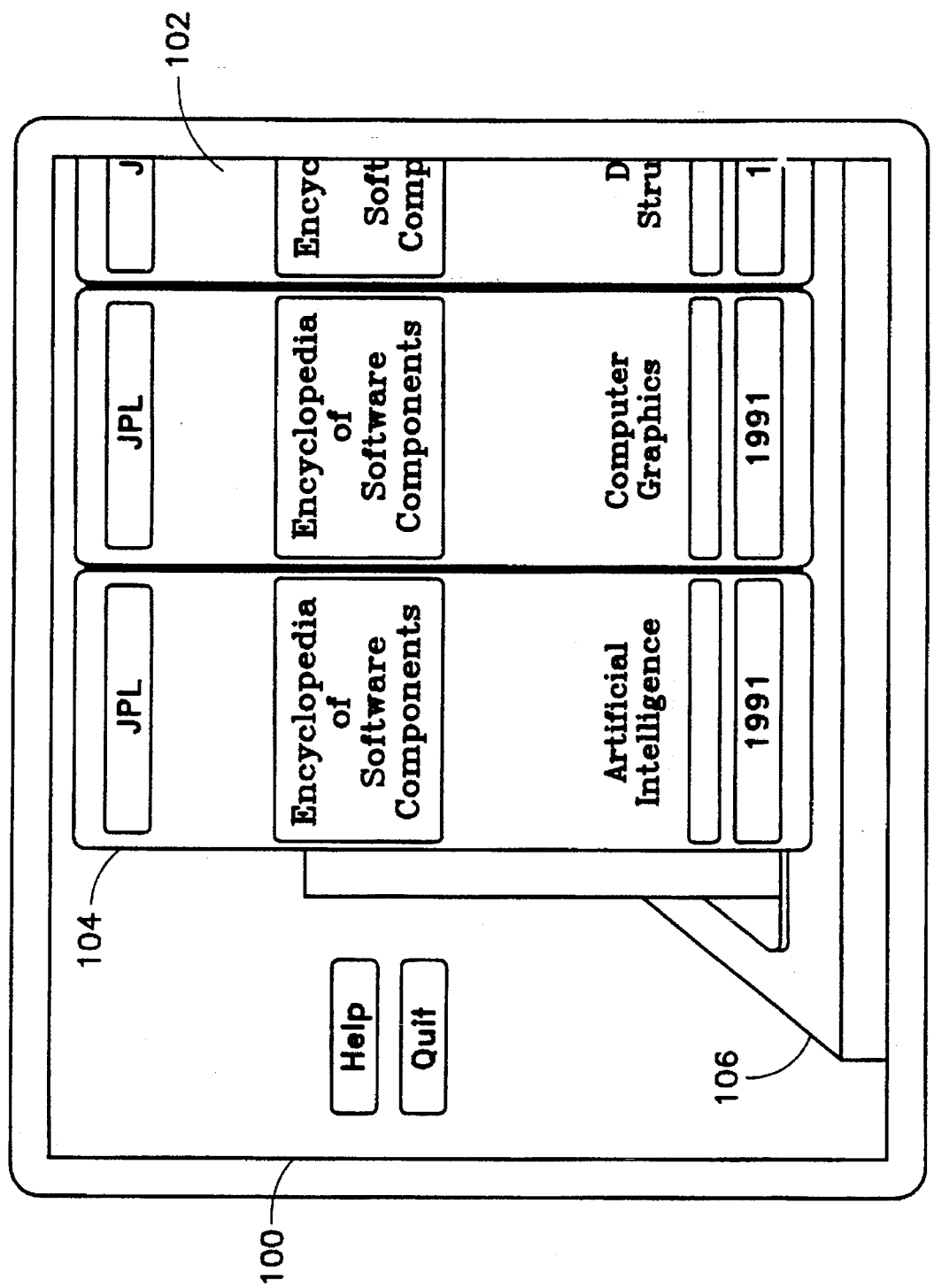
FIG. 1 depicts a portion of a computer generated video display representing one aspect of the encyclopedia metaphor of the invention.

One of the ways the ESC supports an encyclopedia metaphor is by displaying a shelf of books about software in a widow on the programmer's screen, as shown in FIG. 1. We choose the metaphor of an encyclopedia for three reason. First, the encyclopedia metaphor is uniquely suited to realization in hypermedia. Second, the metaphor will be immediately familiar to most software developers, who are literate people who have used traditional encyclopedias often. Third, the encyclopedia is an appropriate metaphor on epistemological grounds. Encyclopedias arose from efforts to classify and encapsulate all human knowledge. They use pictures, text and a rich web of cross references to cope with expansive, complex, ill-bounded, ambiguous, and incomplete knowledge. Except for special cases (such as computational mathematics), high-level descriptions or software are inexact. In many cases, the only exact description of a piece of software is the software itself. Yet, high-level descriptions are precisely what are needed by reusers who must understand and evaluate a component quickly before "buying," without learning the details. Being inexact, high-level descriptions can be expansive, complex, ill-bounded, ambiguous, and incomplete, i.e., the kind of knowledge for which encyclopedias were designed. Furthermore, classifying software is almost as difficult as classifying all human knowledge. The reason is that software can be written about any topic. It is a kind of universal theory language-any sufficiently cogent idea can be "brought to life" as a computer program. Thus, the space of knowledge of the application domains of software is almost the same as the space of all human knowledge. We conclude that the encyclopedia is an appropriate metaphor for representing and containing knowledge about software.

A metaphor for a simpler mechanism of an encyclopedia might be a catalog. Such a metaphor could adequate for certain, restricted kinds of software. Consider again the example of computational mathematics. The language of mathematics is sufficiently precise and universal that it is possible to give unambiguous, highlevel specifications of mathematical software components. Furthermore, this field is reasonably well understood, and there is reasonable consensus on the overall framework for classifying works in the field. Specifications and taxonomies are currently published in massive paper catalogs. Users can retrieve components from repositories with high confidence that the components will meet their requirements, which are expressed in the same language as the specifications. However, other areas of software application are not as standardized nor as easily described as mathematics. Generally, it is necessary both to describe software with long narratives, diagrams, and even video; and to describe the relations between components explicitly and separately for each pair of components. Different kinds of structures are needed to present different kinds of high-level information. Because of its rigid, uniform structure, the catalog metaphor breaks down when stretched to represent fuzzy and variegated knowledge.

The realization of the ESC consists of computer programs (subsystems) to simulate the appearance and operation, as it were, of an encyclopedia. The ESC user has access to three subsystems through mutually consistent graphical user interfaces (GUIs) of the applications driver 300 of FIG. 3:

the bookshelf browser 304 supports unstructured, interactive browsing.

the searcher 306 supports goal-directed, logical query-style searches.

the publisher 308 supports automated component insertion and rebuilding of the browser and searcher.

The bookshelf window of the video display 224 of FIG. 2 is the primary interface to the ESC. It contains a picture or a shelf or books strongly reminiscent of encyclopedias (FIG. 1). This window waits visibly in the background of the programming environment, ready to be brought to the foreground when the need to find a software component arises. When dormant, the bookshelf window is analogous to a bookcase containing dormant reference materials. When active, the bookshelf window and its subwindows are analogous to reference books open on the programmers desk. The bookshelf is designed to be inviting and obvious; one or our goals is that it must be possible to learn how to use the ESC simply by using it.

Figure 4:
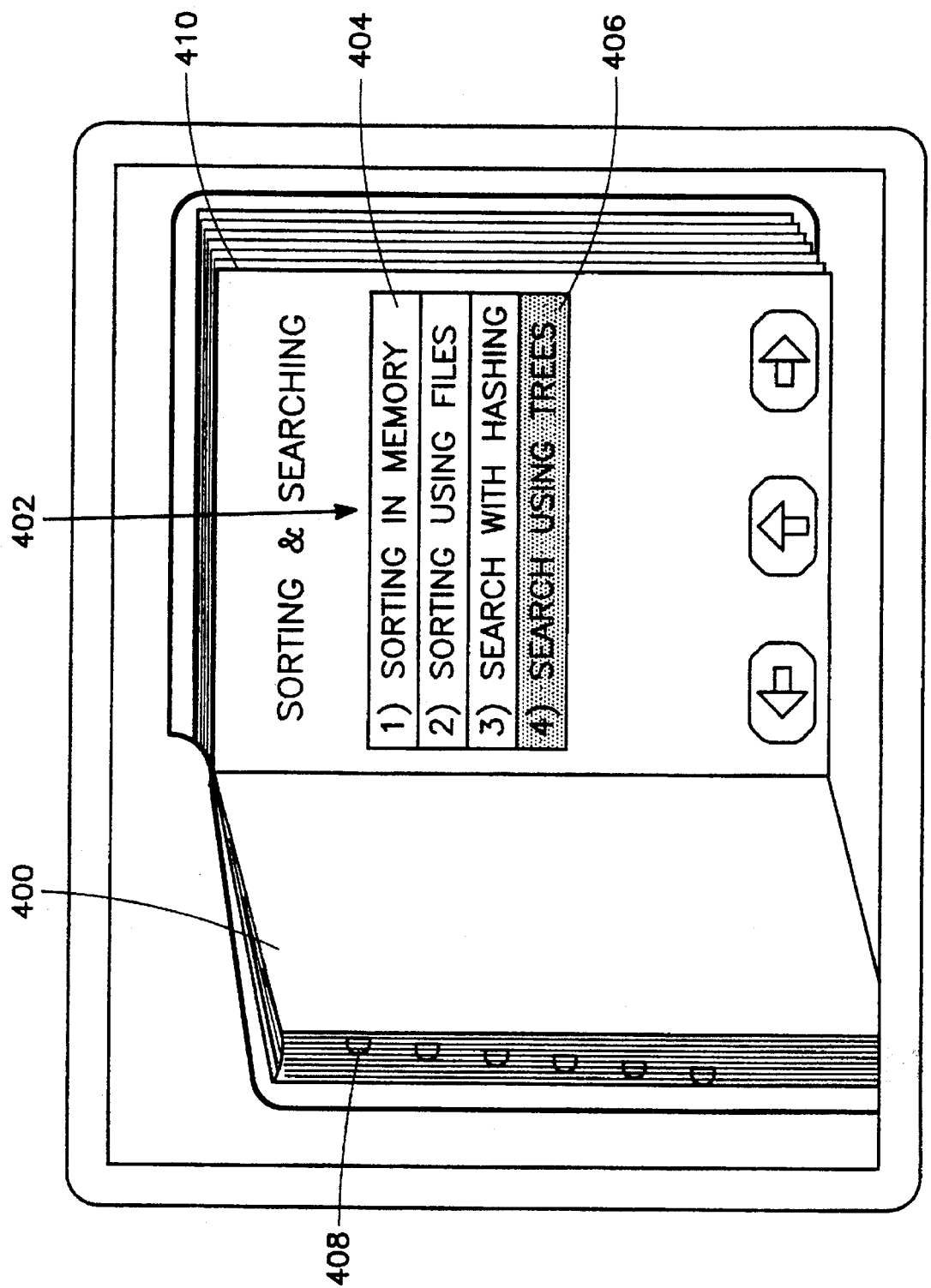
FIG. 4 depicts a computer generated video display representing another aspect of the encyclopedia metaphor of the invention.

The titles 100 on the book spines 102 (FIG. 1) denote application domains, e.g., Artificial Intelligence, Computer Graphics, Data Structures, and so on. These titles correspond to an implicit question asked or the user, "What is the application domain of the software you are looking for?" When the user clicks on the spine 102 of a book 104, the book 104 is opened. Accompanied by the sound of a book being removed from a shelf 106, a picture of a book 400 open to a hierarchical table of contents 402 is presented in a new window or video display illustrated in FIG. 4. Each item 404 in the table of contents 402 has a link or "button" to a deeper level in the ESC classification scheme which the user can explore by "clicking" onto the item 404 with a cursor 406 or a mouse (not shown). The table of contents 402 usually corresponds to a second implicit question asked of the user: "What is the functionality of the software you are looking for?"

When browsing, the user supplies successively sharper characterizations of the software of interest by choosing options from button lists and traversing deeper levels in the open-book window. Index tabs 408 appear on the edges of pages 410 passed to help the user keep track of current location. The button lists, index tabs, and open-book displays are linked together in a hierarchy that mirrors the ESC classification hierarchy. This hierarchy can be tailored to some degree at the time the ESC is built with the Publisher 308 (the process of building the ESC is explained in greater detail below)

Figure 5:
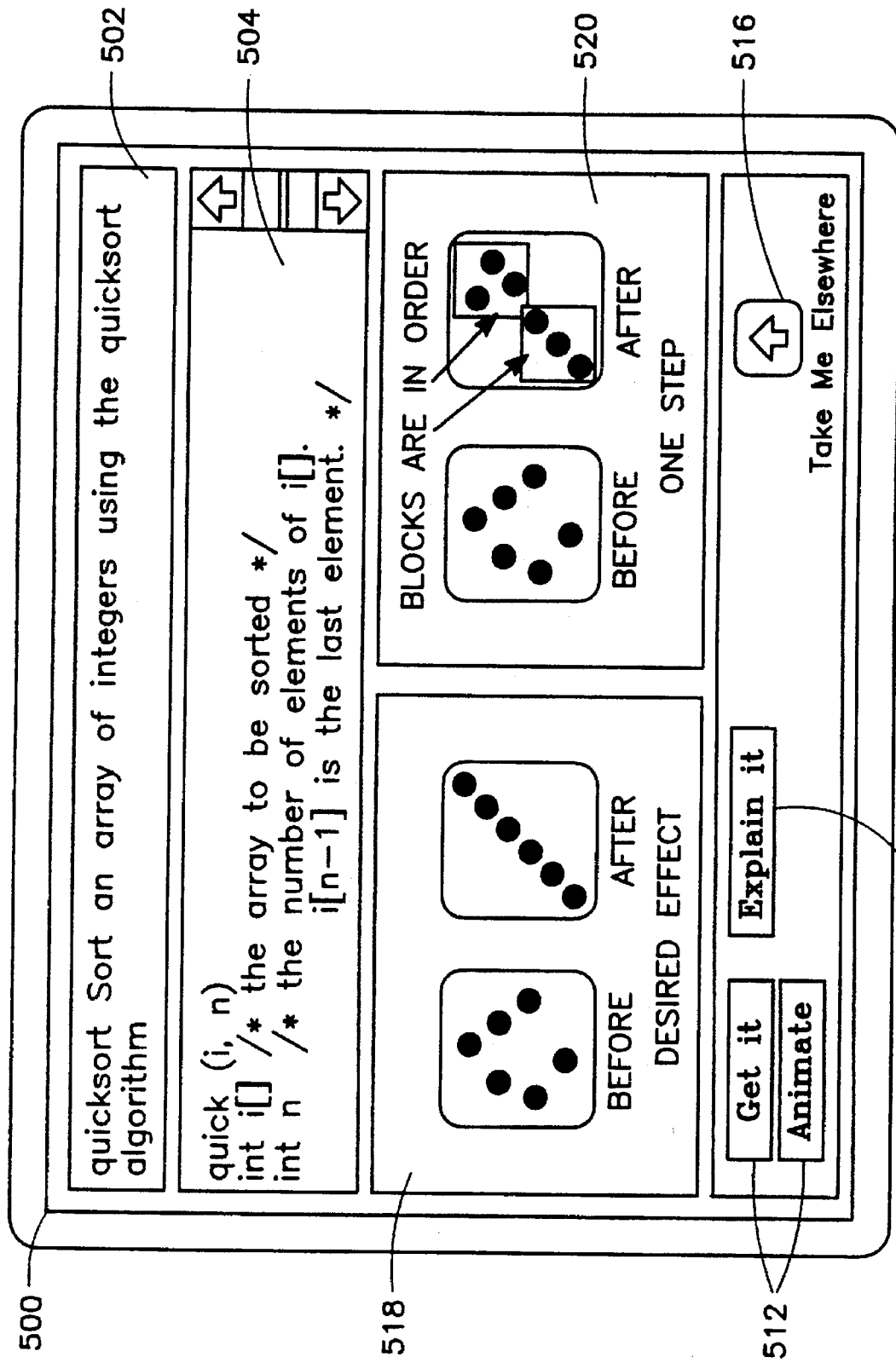
FIG. 5 depicts a computer generated video display of a dataplate in one aspect of the tray metaphor of the invention.

Eventually, the user reaches the final, lowest level of the hierarchy, arriving at one or a few components. At that point, a new kind of metaphor, a tray of informative plates including the data plate 500 illustrated in FIG. 5, is displayed on the user's video monitor. The data plate 500 displays information about the component, references to related components, and buttons for automated retrieval of the component, including the transitive closure of all software on which the component depends, from distributed repositories. Any network connections, dial-ups, mounting of remote file systems, etc., necessary for retrieval are done automatically by the ESC.

For example, in FIG. 5, the data plate 500 explains the quicksort algorithm software component using a title and descriptor field 502, a code field 504 and animation fields 506, 508 illustrating the operation of the software component. The user can "click" on any one of several buttons, including a Get It button 510 for retrieving the software component itself, an Animate button 512 for running an animated display (for example a cartoon that may be available for this software component), an Explain It button 514 for displaying a detailed text explanation of the software component and a Take Me Elsewhere button 516 for terminating the session with the present software component. Graphical displays 518, 520 (which may be animated upon request) graphically depict the concept of the algorithm performed by the software component.

Figure 6:
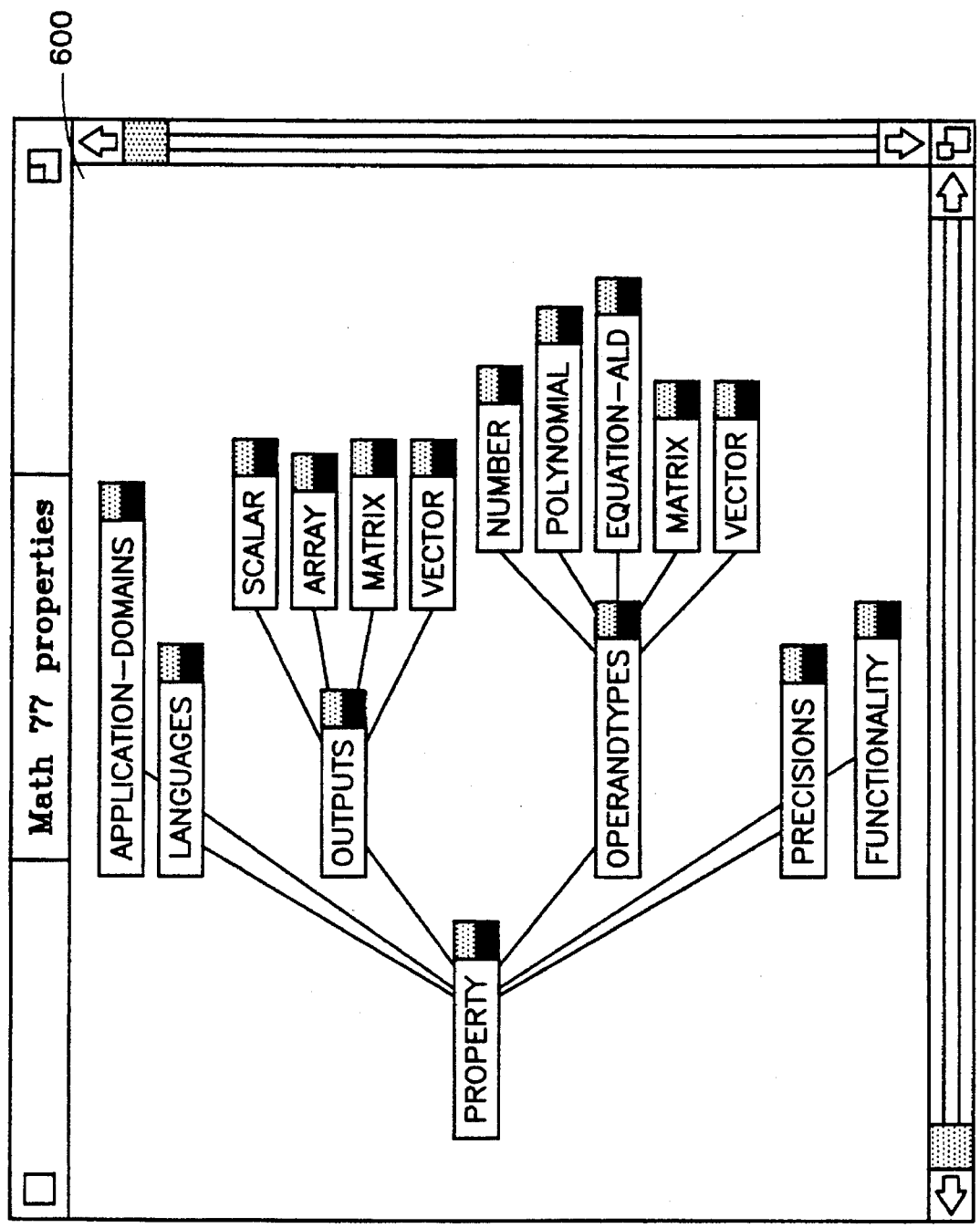
FIG. 6 depicts a computer generated video display of a taxonomic graph in one aspect of the navigation aid feature of the invention.
Figure 7:
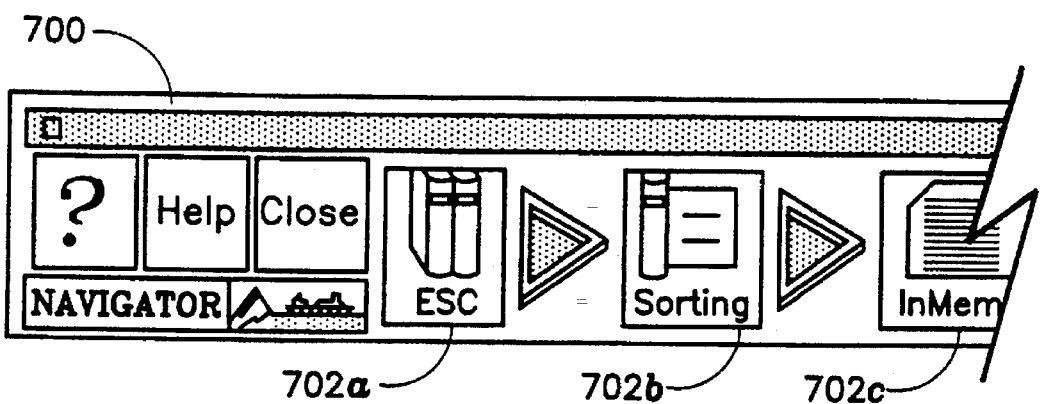
FIG. 7 depicts the leftmost part of a computer generated video display of a user's search path in another aspect of the navigation aid feature of the invention.
Figure 8:
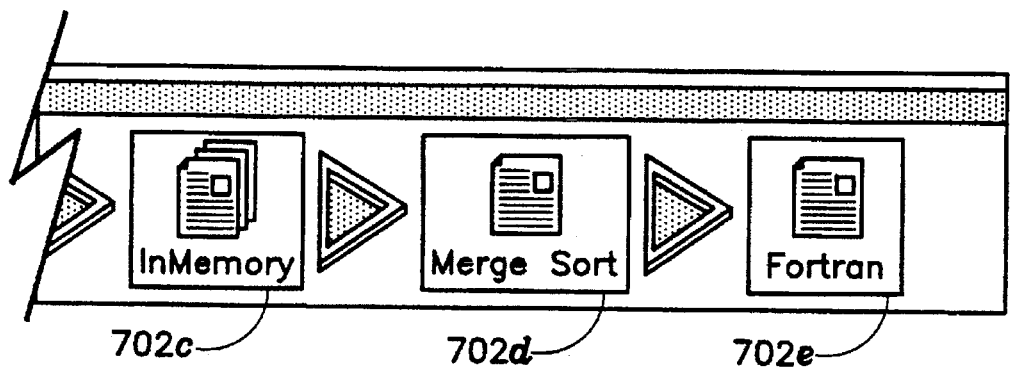
FIG. 8 depicts the rightmost part of a computer generated video display of a user's search path of FIG. 7.
Figure 9:
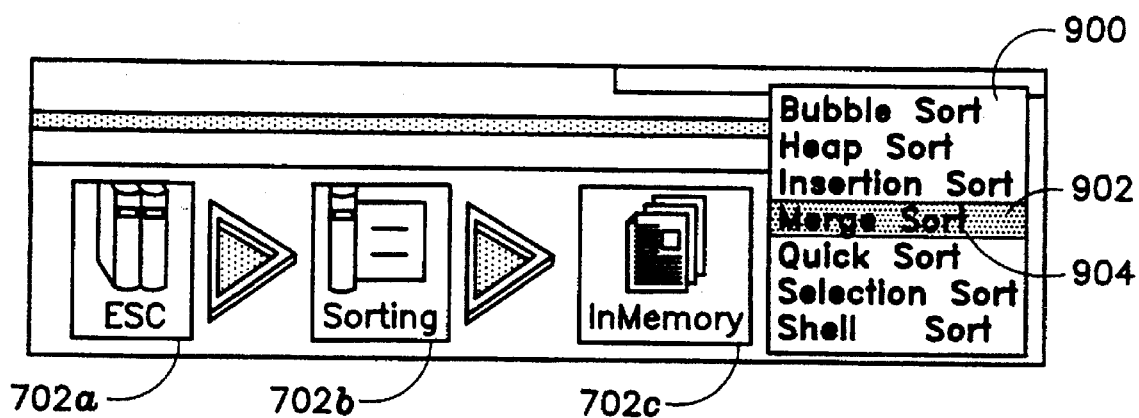
FIG. 9 depicts the computer generated display of FIG. 7 with a pop-up menu listing search path branching options.

We make a conscious effort to limit the depth and the branching factor of the ESC, attending to a "magic number seven, plus or minus two" that characterizes the limitations of human short-term memory. To aid the user further, the Bookshelf is integrated with spatial and temporal navigators:

an overview diagram that shows the contents of the entire encyclopedia in the form of a graph (FIG. 6), and a history list that keeps track of the user's path through the graph in the form of a stack with optional branching points at each level (FIGS. 7, 8 and 9).

The graph 600 of FIG. 6 corresponds to a relevant portion of the object oriented data base 214 of FIG. 2. In FIG. 6, the graph illustrates a taxonomy of mathematical properties, in which a generic block 602 named "property" branches into topical blocks 604 which in turn branch out into sub-topical blocks 606. The graph 600 serves as a guide to the user in planning his search or browse activity.

The history list 700 of FIG. 7 keeps the user from getting "lost" by showing him where his search or browse activity has thus far taken him. The history list 700 is somewhat redundant with the index tabs 408 of FIG. 4, but the evident metaphorical value of the latter argue for keeping them. Also, we feel that having a large variety of albeit redundant navigation aids, especially for large hypermedia documents, is helpful rather than confusing. Such tools are held to be generally helpful in hypermedia systems and are well-known in the art. Each block 702 in the history list is a window depicting the software topic or component that the user has looked at in chronological order from left to right. In the example of FIGS. 7 and 8, the user has started at the highest browse level, so that the first block 702a is the encyclopedia bookshelf display of FIG. 1. The user next selected the sorting topic from the table of contents of one of the volumes so that the next block 702b illustrates an open volume at the appropriate page. The user next selected the attribute "In Memory" and from the resulting information in the "In Memory" block 702c selected the Merge Sort algorithm of block 702d. FIG. 8 shows that the last selection of the user was a fortran listing of the Merge Sort software component (block 702e). FIG. 9 illustrates the use of a pop-up window 900 which the user can request to make a selection at any block. In the example of FIG. 9, the user has requested a listing of the various sort routines performed in memory at the "In Memory" block 702c, so that the pop-up menu 900 lists all of the available software components which perform sort routines in memory. The cursor 902 is on the Merge Sort label 904 of the pop-up window 900, so that the user can "click" on the label 904.

The Searcher allows a user to specify desired characteristics in any order, unlike the Browser, which encourages a time order of access that mirrors the classification hierarchy. The Searcher bypasses the encyclopedia metaphor and instead first presents classification criteria in scrolling lists from which selections are made. No lists are presented that are not known to be germane at any point. For example, a user who has not sufficiently sharpened a query to distinguish between mathematical software and computer graphics software would neither be given a list of arithmetic precisions to choose from nor a list of color conventions to choose from. The user can specify search criteria in Boolean combinations of pattern-matching expressions. The Searcher is accessible from buttons on the overview diagram and from a menu. Whenever the user "clicks" on a particular software component on a list, the "tray" of that component is then displayed so that the user can view the various informative plates therein, such as the data plate illustrating the attributes of that software component.

Both the Bookshelf and the Searcher depend on a flexible and robust classification scheme. When developing the ESC, we discovered the simple hierarchies (e.g., the Dewey decimal system) and faceted classification schemes that classify via a fixed number of characteristic are inadequate. To give one counterexample, consider software for solving equations. A straightforward faceting scheme would have us classify all such software under the intersection of the functionality=solve facet and the operand=equations facet. At this point in the Cartesian facet space, however, we may have several thousand components, far too many for a user to peruse and choose from at one stroke without further refinement. The reason is that there are many different descriptors for equations, e.g., algebraic, Diophantine, linear, nonlinear, differential, separable, etc., and many different kinds of solution algorithms. It is not right to represent all equations with the Cartesian product of all equations descriptors because many compound descriptors denoting equation types that do not exist will result. Furthermore, it is not right simply to add every kind of equation to the operand facet and every kind of solutions strategy to the functionality facet because not every solution strategy is applicable to every kind of equation. A great number of empty points in facet space would be created. The faceting scheme itself breaks down under this counterexample. Equations and solution strategies naturally fit into a hierarchy of types that simply does not map to a Cartesian space. We find that faceting, while a powerful and even necessary classification technique, does not suffice alone to represent many kinds of taxonomies.

In an alternative embodiment of the invention, the classification scheme of the Searcher is based on semantic networks, which are standard AI structures for representing knowledge. Such a taxonomic scheme allows the builders of a collection to specify arbitrary characteristics of components of the collection and arbitrary relations among the characteristics. This scheme is rich enough to represent virtually any kind of software artifact, from design documents to program schemata to data structures to individual procedures.

The Publisher is the subsystem for adding new classification structures and new components to the ESC. Its user interface has mandatory and optional on-line forms to fill in with attributes of a component. The mandatory attributes constitute catalog and classification information. They include items like the name of the component, its function, its programming language, its application domains, the names of directories and files containing the component source and documentation, the version number, the date of posting, and so one. The values of these attributes are organized in multiple inheritance hierarchies that represent the taxonomic hierarchy. The optional attributes are user-definable, though some are named by reserved keywords, and constitute search and usage information. The optional forms allow the user to add arbitrary, new, hierarchically structured attributes to the description of any component. The Publisher also rebuilds the entire hypermedia system, through a lower-level subsystem, called the Hypermedia Generator, to ensure internal consistency among the Browser and Searcher and external consistency with the database.

It is possible to use the Publisher to create arbitrary databases and to generate a Browser and Searcher with the Hypermedia Generator. Thus, a user can create special-purpose, custom collections of software with front ends just like that of the ESC. these custom collections are called "Handbooks of Software Components" to distinguish them from the master "Encyclopedia of Software Components." It is useful to reserve that specific name for a single, refereed collection components. Users are free to create as many Handbooks as desired, but contributions to the ESC are moderated by us for the time being.

In another alternative embodiment of the invention, the Searcher uses deduction and case-based reasoning to help the user find desired software. In this alternative embodiment, the Browser can aid a lost user by using machine learning to detect well-worn browsing paths that others have traversed and to suggest short cuts. The instrumentation for such learning features in the Browser would also pay dividends in the empirical assessment program by aiding data collection.

In yet another alternative embodiment of the invention, the ESC suggests some validation grades, such as those in Table 1, to the software contributor.

A+ Formally validated.

A Exhaustively tested over the input domain.

A− Tested on random inputs (Monte Carlo).

B+ Packaged with test data and working test programs

B Extensively reused by programmers other than the author of the component (say, in n applications by k other programmers).

C Extensively reused by the author of the component (in n applications for m years).

D Used by the author in one application.

F Untested.

Table 1

One clear direction for development is in supporting formal testing regimens directly in the ESC. Requiring test routines, input sets, and results to be packaged with components would be a start. Allowing the user to execute test programs interactively on a candidate component before committing to retrieval, with support for perusing and visualizing the results, would be another step.

As regards adaptation, the ESC contains software in many programming languages and for many hardware and software platforms. Nothing in the taxonomic scheme of the ESC restricts its contents in any way. However, the programming language and platform attributes are identified in the description of every component. Adaptation, that is, the changing of interfaces between a component, its calling software, and its platform environment, is currently left to the user.

The ESC can (and should) contain adaptation libraries, e.g., software emulations of operating systems, portable implementations of POSIX, language bindings of graphics standards, portable programming language processors, and so on. Directions and tools for calling C routines from ADA, Fortran routines from Lisp, etc., should be packaged with components.

The invention overcomes the need for revolutionary new programming languages, paradigms, tools, and methodologies to take hold before attacking the problem of software reuse from the consumer side. The invention makes it easier not only for consumers of reusable software to find what they want but for the moderators of collections of software to maintain and update collections as well as the hypermedia front ends that make access easy.

Working Example

Figure 10:
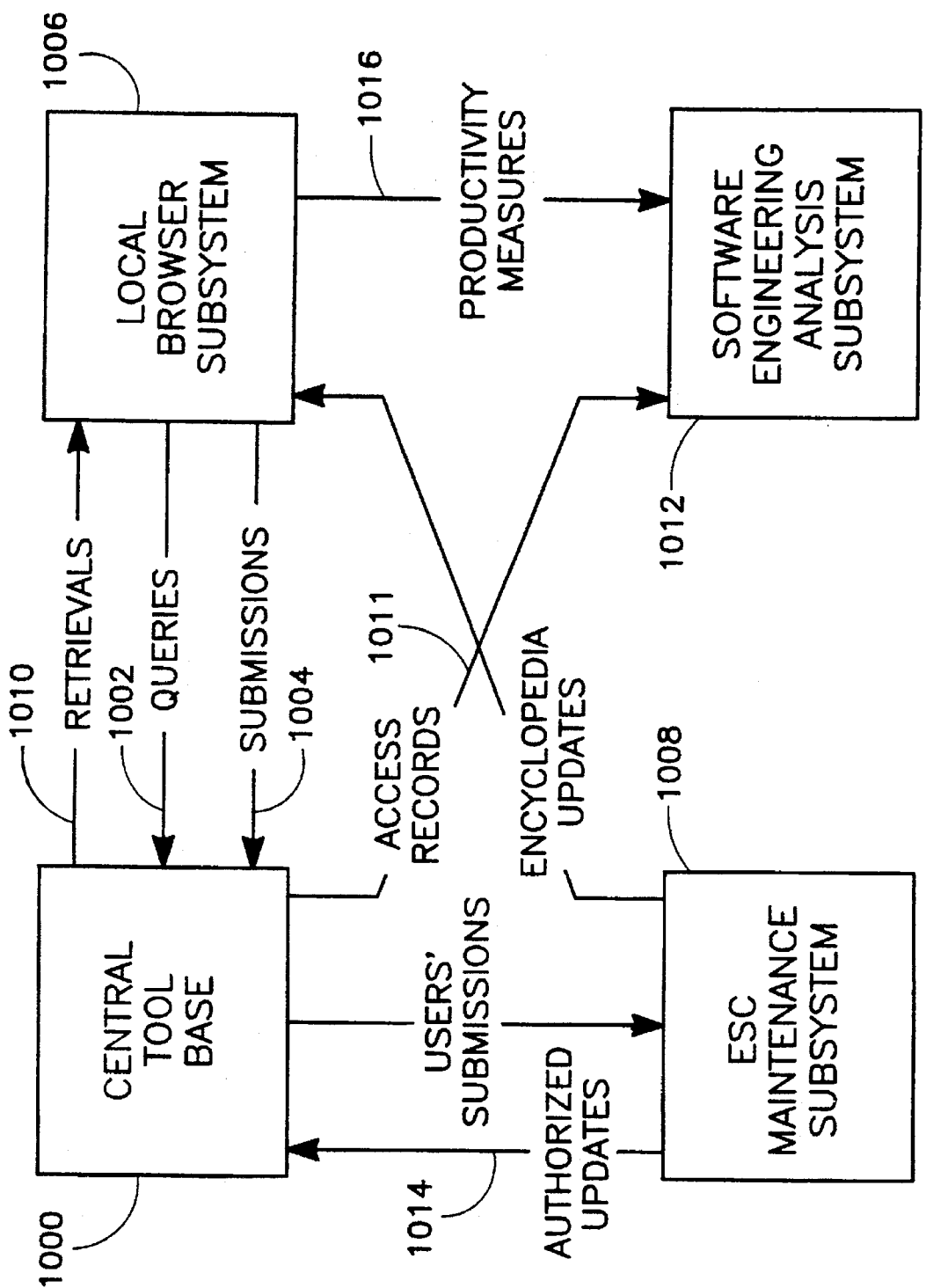
FIG. 10 is a block diagram of a computer system embodying the invention corresponding to FIG. 3.

The system of FIG. 3 will now be described in detail with reference to the schematic system diagram of FIG. 10. The Central Tool Base 1000 is the repository of the reusable software that the Encyclopedia metaphor refers to. It receives user queries 1002 about software attributes and submissions 1004 of new software from the local browser subsystem 1006, where the user of the entire ESC system resides. It receives authorized updates from the ESC maintenance subsystem 1008. It sends retrievals 1010 of software components to the local browser subsystem 1006. It sends the users' submissions 1004 through to the ESC maintenance subsystem 1008. Access records 1011 are automatically collected by the central tool base 1000 and sent to the software engineering analysis subsystem 1012, where evaluation of the ESC takes place. The central tool base receives authorized software component updates 1014 from the ESC maintenance subsystem 1008. Productivity measures 1016 are transmitted by the browser system 1006 to the analysis subsystem 1012.

Figure 11:
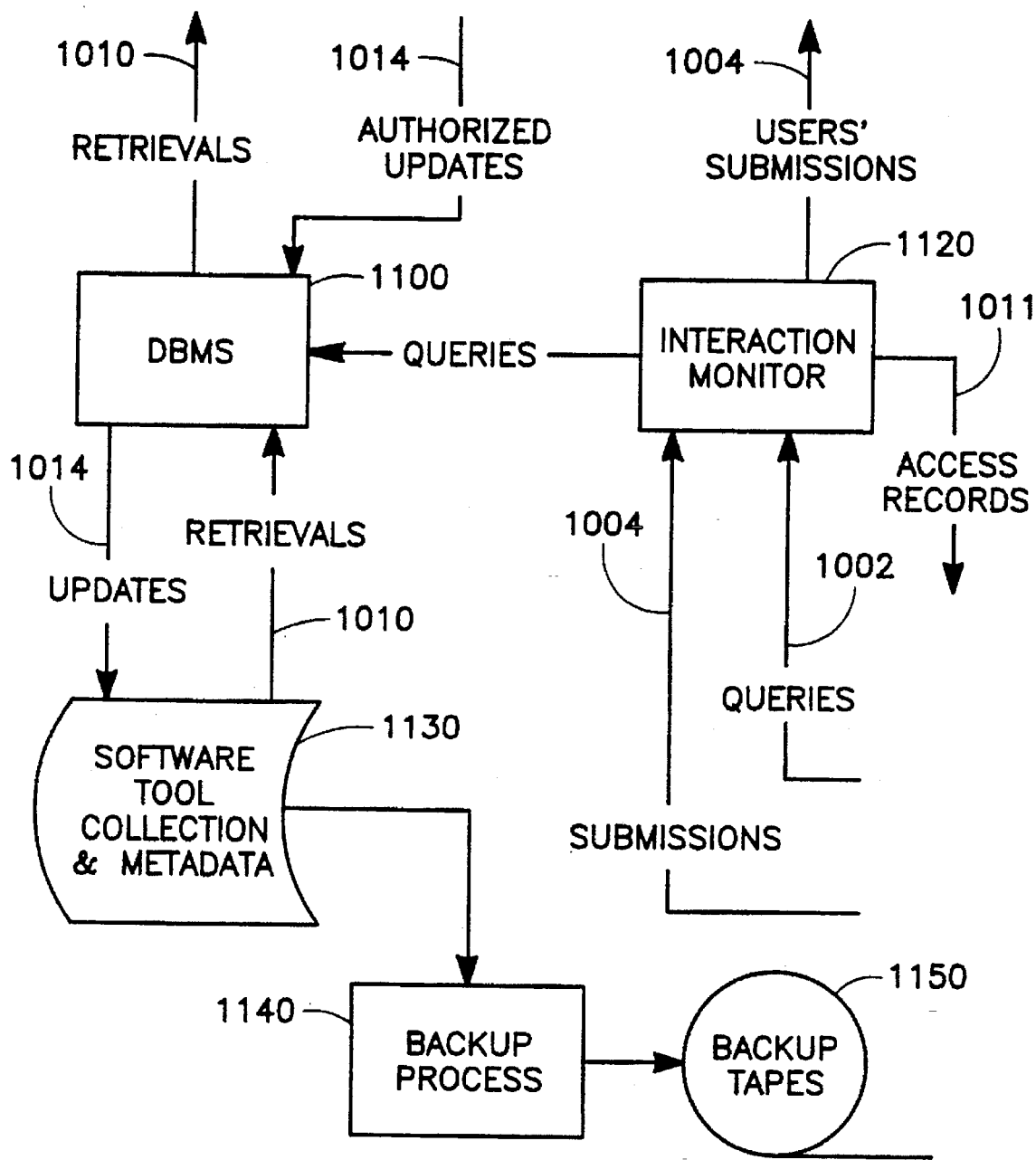
FIG. 11 is a block diagram of the central tool base of the system of FIG. 10.

Referring to FIG. 11, the central tool base 1000 consists of a data base management system (DBMS) 1100, and interaction monitor 1120, a software tool collection 1130, a backup process 1140 and backup tapes 1150 or an equivalent mass storage device. The DBMS 1100 implements the central tool base 1000. It controls access to and modification of the Software Tool Collection 1130 (which includes metadata), which is the file containing the actual data. The DBMS 1100 communicates with that file via updates and retrievals. Retrievals from the tool collection 1130 are sent to the local browser subsystem 1006. The DBMS 1100 receives queries 1002 from the interaction monitor 1120. It receives authorized updates 1014 from the ESC maintenance subsystem 1008 and forwards them to the software tool collection 1130. The interaction monitor 1120 receives queries 1002 and submissions 1004 from the browser subsystem 1006 and forwards the queries 1002 to the DBMS 1100 and forwards the submissions 1004 to the Maintenance subsystem 1008. The interaction monitor makes an access record of all user activity and forwards the access records 1011 to the analysis subsystem 1012.

Figure 12:
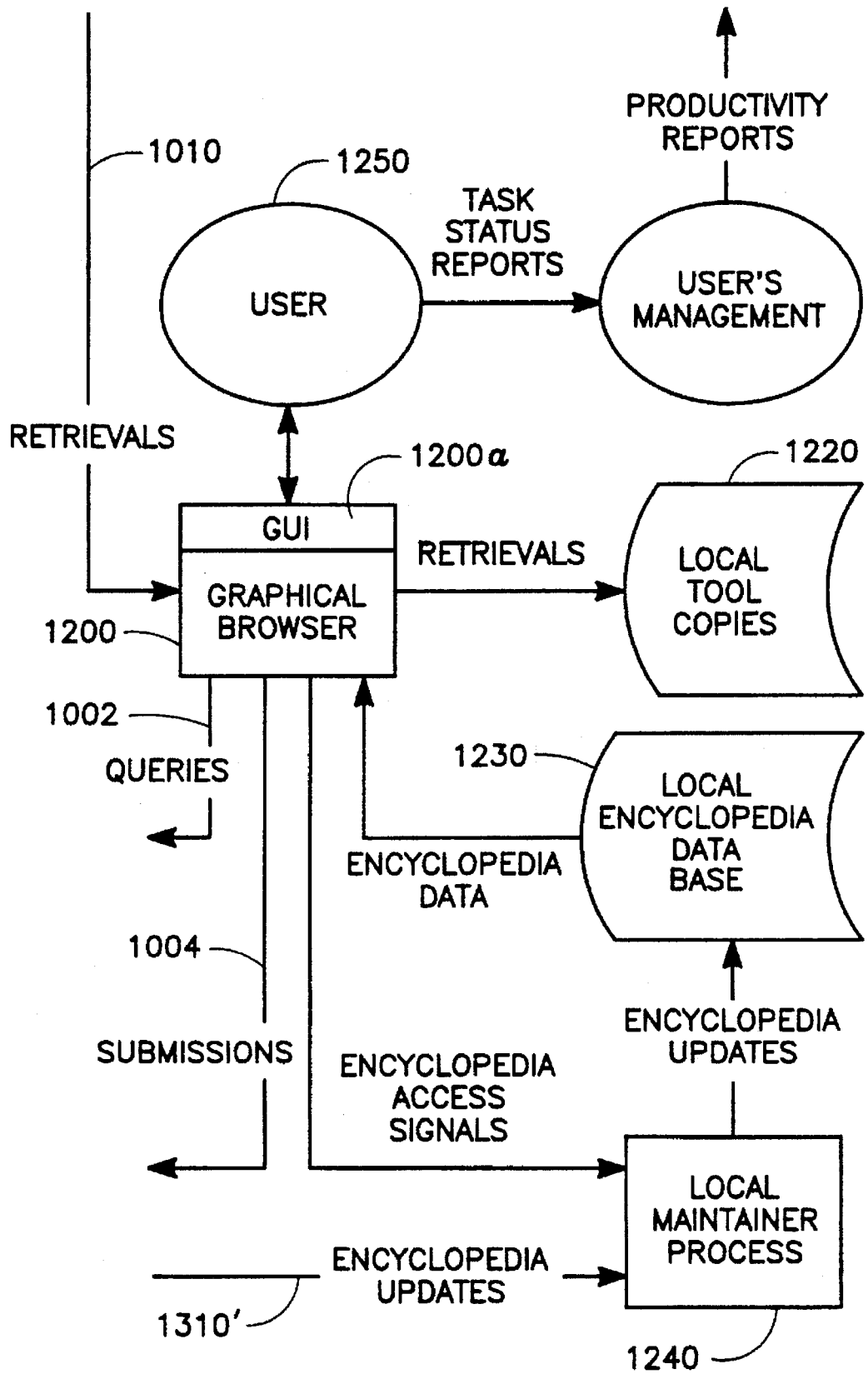
FIG. 12 is a block diagram of the browser system in the system of FIG. 10.

Referring to FIG. 12, the browser subsystem 1006 consists of a graphical browser 1200, local tool copies 1220, local encyclopedia data base 1230 and a local maintainer process 1240. The graphical browser 1200 includes the interface 1200a of the ESC with the user 1250. As the browser 1006 is used, it generates queries 1002 and submissions 1004, which are sent to the central tool base 1000. Retrievals 1010 from the central tool base 1000 are received by the local browser subsystem 1006. Productivity measures 1016 and other evaluation data are generated in the local browser subsystem 1006 (by the user 1250 or others), and they are sent to the software engineering analysis subsystem 1012 for analysis and incorporation into publications and presentations.

The graphical browser 1200 is a reading system for color, multiwindow, large window graphical hypertext. The graphical browser 1200 interprets the user's mouse clicks and keyboard hits, generates queries for the central tool base, passes user submissions to the central tool base (which routes them to the ESC maintenance subsystem after recording the transaction), routes retrievals of software to the repository of local tool copies 1220, gets encyclopedia data (cards) from the local encyclopedia data base 1230, and sends signals to the local maintainer process 1240. These last signals inform the local maintainer process 1240 when and how to update the local encyclopedia data base 1230.

The local maintainer process 1240 receives commands (or signals) from the graphical browser 1200 that informs it when an how to update the local encyclopedia data base 1230. These updates take the form of new trays of informative plates or "cards" to be inserted into the encyclopedia data base 1230, either adding to it or replacing old cards. The maintainer process 1240 receives new cards from the ESC maintenance subsystem 1008.

The user 1250 is a programmer (or software engineer) engaged in some software development task. The goal of the ESC task is to measure the impact of ESC on programmer productivity. The user 1250 interacts with the graphical browser 1200, giving it mouse clicks and keyboard events. The user 1250 receives graphical displays from the graphical browser 1200. The user 1250 files task status reports to his or her management, which interprets them and assesses productivity.

Figure 13:
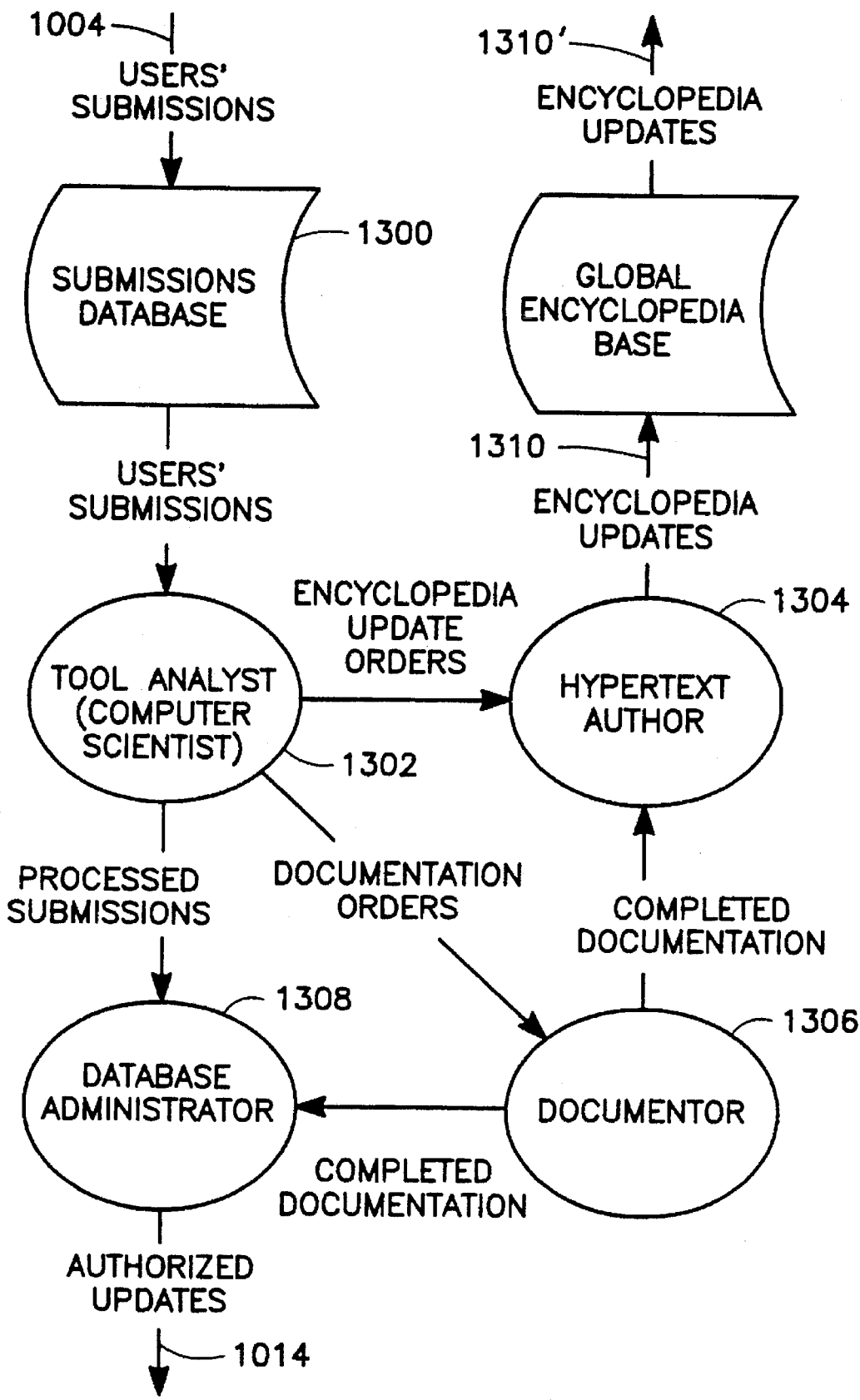
FIG. 13 is a block diagram of the maintenance subsystem of the system of FIG. 10.

Suppose a user has a tool, utility, or other reusable software component that he feels ought to be represented in the encyclopedia. The user will have available a "submit" operation, allowing him to submit the software and supporting material to the encyclopedia. The submission first flows from the local browser subsystem 1006 to the central tool base 1000, where it is automatically logged as a type of transaction or access. The log entry is sent (automatically) to the software engineering analysis subsystem 1012. Referring to FIG. 13, The user's submission is sent to a submissions data base 1300 or "holding tank" in the maintenance subsystem 1008. A submissions evaluation team, including a tool analyst or computer scientist 1302, a hypertext author 1304, a documentor 1306 and a database administrator 1308 takes it from there, evaluates it, tests it, documents it, and creates graphical hypertext for it. When a user's submission has passed the ESC maintenance subsystem evaluation team, an authorized update 1310 may be sent through a global encyclopedia base 1312 of the maintenance subsystem 1008 to the central tool base 1000, with a concomitant encyclopedia update going to the local browser subsystem 1006.

Figure 14:
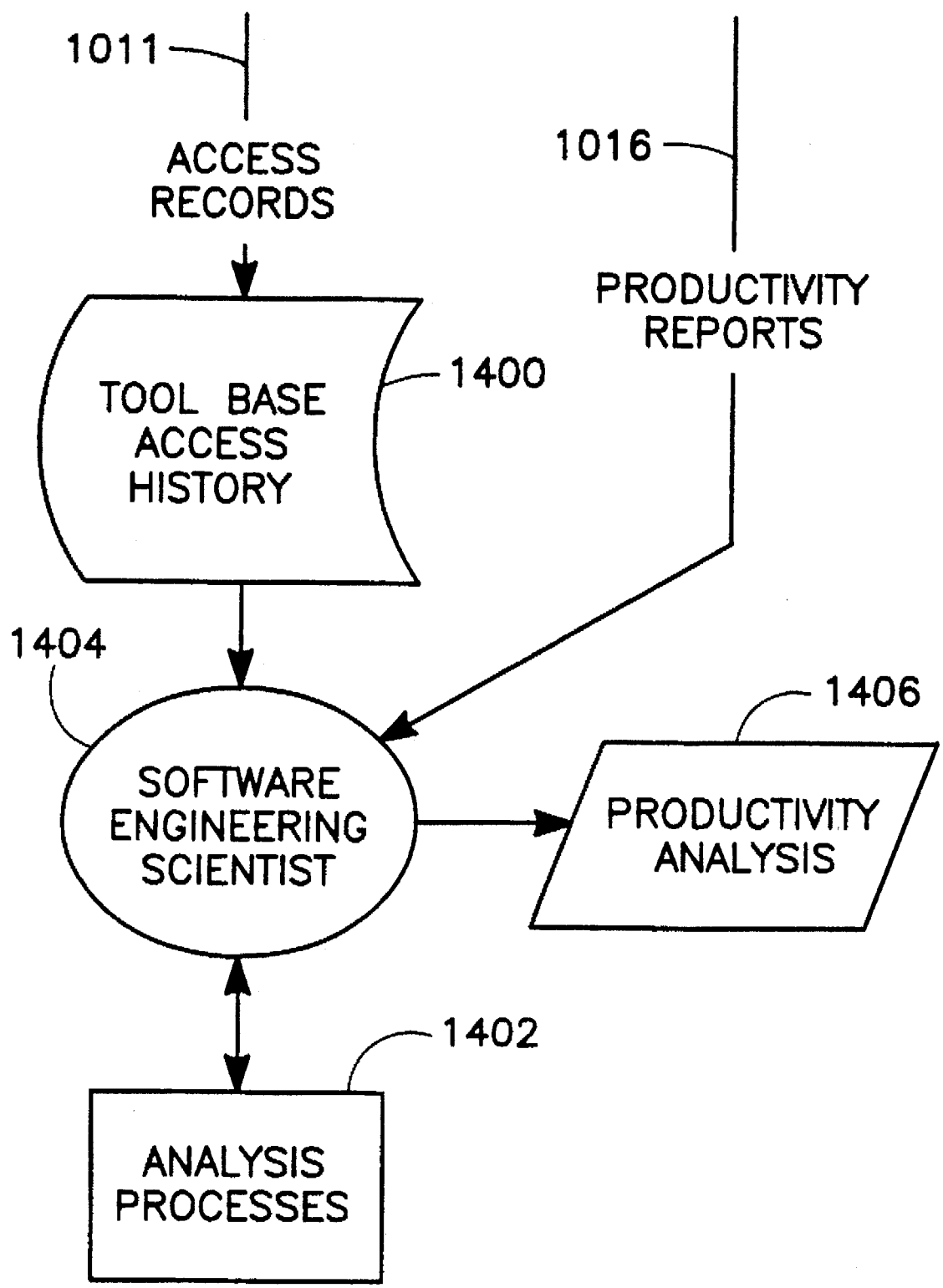
FIG. 14 is a block diagram of the analysis subsystem of the system of FIG. 10.

The Software Engineering Analysis subsystem 1012 is the locus of evaluation of the ESC. Referring to FIG. 14, the analysis subsystem 1012 stores the access records received from the browser subsystem 1006 in a tool base access history 1400, which is accessed by analysis processes 1402 through a software engineering scientist 1404 who performs productivity analyses 1406 which produce productivity reports accessible through the local browser subsystem 1006. The questions, "How is ESC used?", "Does it increase or decrease programmer productivity?" are answered by the software engineering scientist 1404 in this subsystem by examining productivity data received from users and their management in the local browser subsystem 1006. They also examine access records automatically produced in the central tool base.

Figure 15:
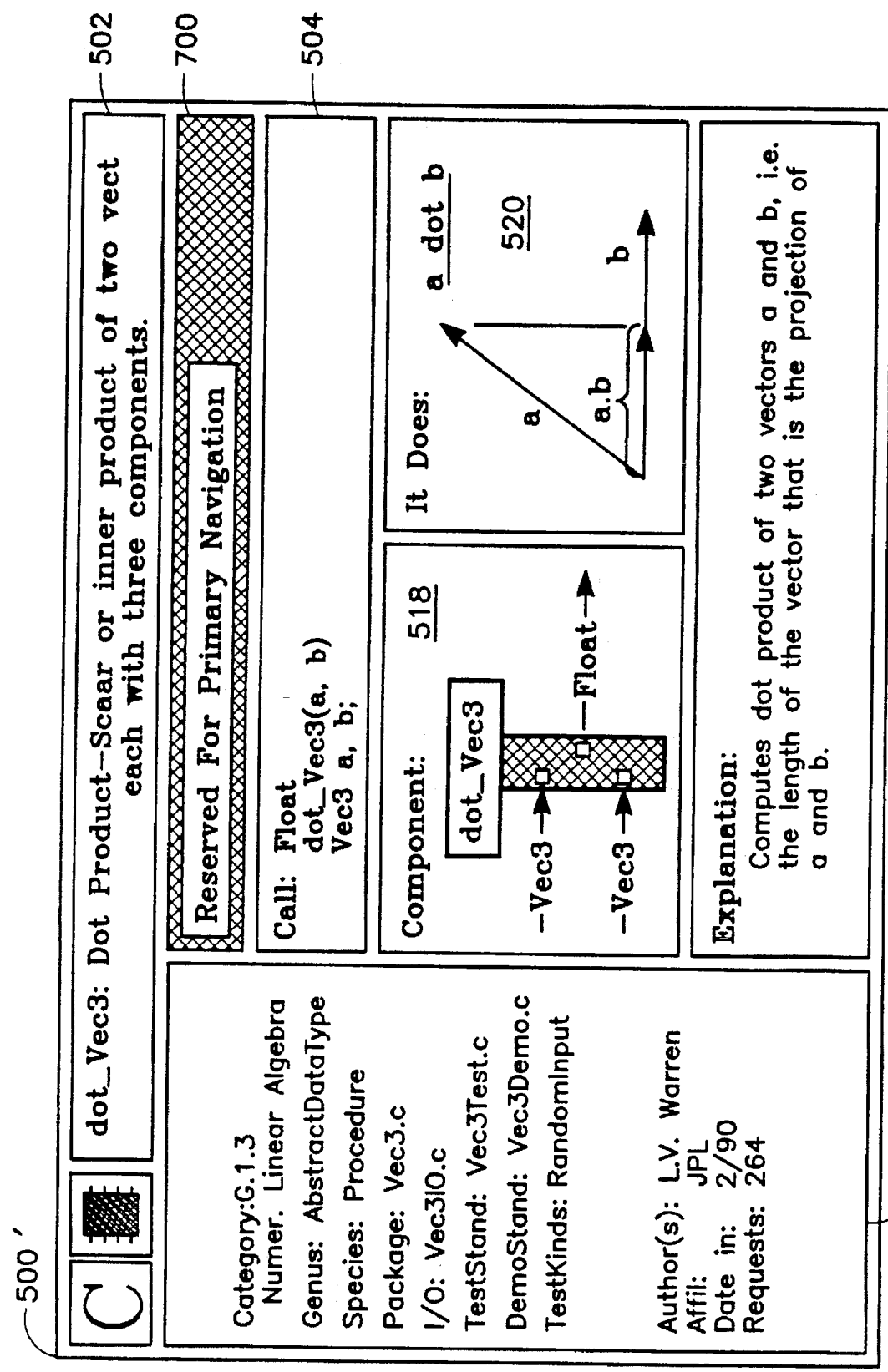
FIG. 15 depicts a computer generated video display representing the tray metaphor of the invention and containing several information plates representing different aspects of the software component of the tray.
Figure 16:
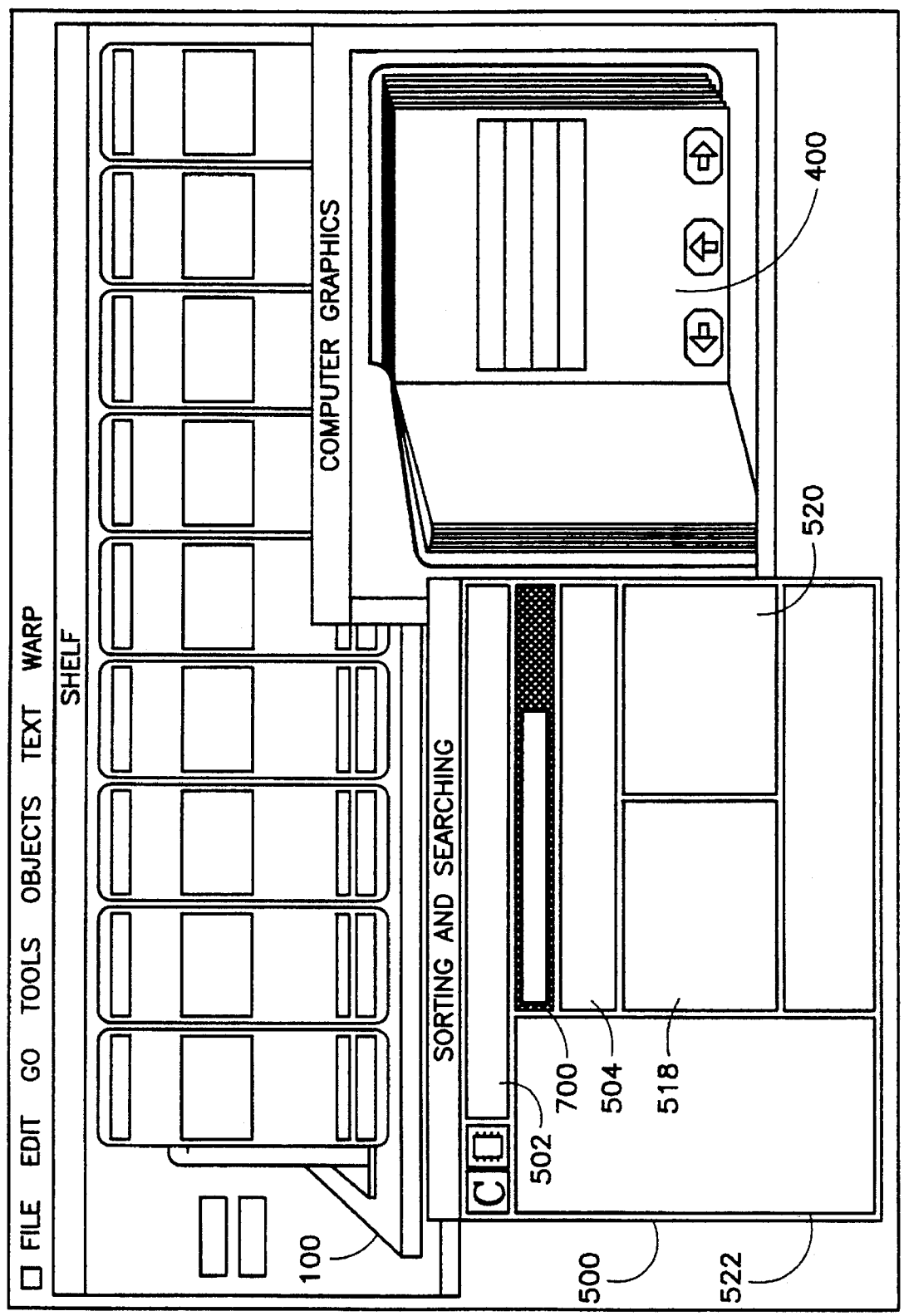
FIG. 16 depicts the full computer generated video display in which the user has opened to one page of a selected encyclopedia volume in the encyclopedia metaphor.

Tray of Informative Plates Metaphor:

Once the user has employed the encyclopedia metaphor 224 (FIG. 2) or the search list 226 to select a specific software component to evaluate for possible use, the browser 1006 displays a tray of several informative plates (or windows) describing various aspects of the selected software component on the user's video monitor. The preferred video display of a tray 500' is illustrated in FIG. 15 which includes, in addition to the informative plates described above with reference to FIG. 5, an additional plate 522 containing additional fields of information. A complete user video display which includes a window corresponding to the encyclopedia metaphor, a window for an opened encyclopedia volume and a window corresponding to the tray metaphor is illustrated in FIG. 16.

There are various types of reuseable software components stored in the ESC. For design purposes these can be divided into two groups. Group One Components are subroutines, functions, procedures and objects with a minimum of entanglements and external dependencies. Group One components live at the language cell level of use. They are small, well abstracted modules of functionality easily incorporated into larger programs. Group Two Components tend to be larger, stand-alone applications that live at the executive or shell level of use. Examples of these are screen editors and system utilities.

The illustration of FIG. 15 shows the tray display of informative plates for a Group One component. The tray display provides, at a glance, a summary of all pertinent information that a user would require to use the component. This visual and textual summary provides several different views of the same component simultaneously. These views will now be enumerated and explained with reference to FIG. 15. The tray as a whole is analogous to a part specification such as that which occurs in a reference work such as The Linear Data Book.

Plate Definitions

Each tray is separated into 6 graphical and textual subfields called plates. There are currently six plates, the Title Plate, the Data Plate, the What Is Plate, the Call Plate, the Part Plate and the Doc Plate.

Title Plate:

This plate contains the name of the software component, its class and a one sentence explanation of what the component is or does. The Title Plate is analogues to the tab on a file folder. It is probably the first thing that a textually oriented user reads.

Data Plate:

This plate contains important type and rating information about the software component. The goal of the Data Plate is to provide good information for finding the right component, if it exists. The Data Plate is analogous to the NEMA rating plate on an appliance that specifies voltage, current and power requirements and is the second thing a textually oriented user might read.

The format for specifying Data Plate files is defined below in accordance with the following fields. Certain fields have buttons on which the user may "click" as described as follows:

Name Of Field: <●>, <▲>

Verbage describing the contents of the field. A Set description if field values draw from an enumerated list of possible values. [valueA, valueB, ... ] Example: Possible contents of field.

If the button symbol <●> (shown in angle brackets above) is present then the contents of the field are accessible through an on card button that the user may press at any time. If the on screen icon <▲> (angle brackets imply it's optional) is present then the contents of the field are interpreted graphically in some form other than the Data Plate on the card. Bold italics indicates fields used in hypertext primary navigation schemes. Bold only indicates fields that are candidates for use in secondary or backup navigation schemes.

The Data Plate fields are:

Native Name Field: ▲

This field specifies the name of the component in its implementation language without argument lists, delimiters, or separators. Example: dot_Vec3

English Name Field: ▲

This field specifies the English name that a person would use to succinctly describe the component. Example: Dot Product One Line Description Field: ▲

This field specifies in eighty characters or less what the component is or does. Example: Dot, scalar or inner product of two three vectors.

Explanation Field: ●

This field specifies in one hundred words or less what the component is or does. Example: The dot product operator computes the magnitude of the projection of one vector onto another.

Read Me Field: ●

This field specifies the name of a file containing documentation in excess of typewritten page about the component. Example: Vec3IO.doc References Field: ●

This field specifies the name of a file containing directly relevant theoretical, science, or engineering information about the component. Example: Vec3.ref Language Field: ▲

This field specifies the language in which the part is written. The set of possible language field specifiers is: [Ada, C, Fortran66, Fortran77, Algol68, Modula2, Pascal, Other] Example: C Category Field:

This field indicates the category of problem that the component is designed to address. The set of possible category field specifiers is published in: "The Full Computing Reviews Classification Scheme 1987 Version" Example:

G.1.3 Numerical Linear Algebra:
  Vector Operations

Genus Field: ▲

This field indicates the bundling class of which the component is a member. The set of possible genus field specifiers is: [Abstract Data Type,Library, Input Output Package, Demonstration, Test, Other] Example: Abstract Data Type Species Field: ▲

This field indicates the type or aggregation level of the component. The Species Field is language dependent. For the 'C' language:

[Main Program, Procedure, Macro, Structure]
For the Fortran language:
  [Main Program, Subroutine, Function, Block Data Subprogram, Common Block]
For Pascal:
  [Procedure, Function, Type]
For Modula:
  [Definition Module, Implementation Module, Procedure, Type]
For Ada:
  [Subprogram, Task, Package]
Example: Procedure
  Package Name Field
  This text field names any membership that the part has in a larger aggregation such as a file or package. Example: Vec3.c
  I/O Name Field:
  This text field specifies the file containing I10 components for the datatypes that the current component manipulates. Example: Vec3IO.c
  Test Stand Field:
  This text field specifies the name of any test stands constructed for use with this component. Example: Vec3Test.c
  Demo Stand Field: Like test stands but simpler, this text field specifies the name of any demonstration stands constructed for use with this component. Example: Vec3Demo.c
  Performance Data Field:
  This text field specifies the file containing performance information about the component. Example: Vec3Test.pmon
  H/W Kind Field:
  Indicates machine makes, models and configurations capable of executing the component. Example:
    Sun 3/50 and
    Sun 3/160 and
    Iris 3130 and
    Iris 4D/20
  S/W Env Field:
  Indicates operating system, compiler, and executive or shell requirements for compiling, linking or executing the component. Example:
    Berkeley 4.2 Unix or
    System V Unix
    Cshell cr
    Bourne shell
  S/W Scripts Field:
  Specifies the name of compilation and linking scripts necessary to make the component operational. Examples:
    Vec3Test.make
    RunVec3.csh
  Test Kinds Field: Indicates what kind of testing has been done and to what extent. Draws from set of: [Certified, Range Tested Random Input Tested] Allowing untested software components to be placed in the encyclopedia is probably a bad idea. Example: Random Input Tested
  Copyright Field:
  Specifies the name and address of the holder(s) of any copyrights, liens, or other encumbrances on the software component. Example:
    Copyright (c) 1984
    Gene Muzak AND
    Supercomputing Services Inc. AND
    Jet Propulsion Laboratory AND
    Motorola Mainframes
  Version Field:
  Component version designators. Example: Version 1.1 Apr. 6, 1984
  Authors Field:
  This ASCII text field specifies the names of the author(s) of the component at the time the component was contributed to the system, with the primary contributor (if applicable) listed first, the secondary contributor next and so on. If the component had multiple contributors who contributed equally, the listing order will be determined by random selection and assignment, and the names will be presented with an asterisk (*) to indicate that this is the case. Example:
    Gene Muzak*,
    Van Warren*,
    Matt Rain*
  Address Field:
  Specifies the terrestrial and electronic mail addresses of the component author(s). Sufficient information should be provided to facilitate communication with real persons, even if this is redundant with other information in the database.
  Template:
    Name Affiliation (Company or Institution)
    Mail Stop
    Street
    City, State, Zip
    Email
  Example:
    Gene Muzak Supercomputing Services Corp. Mail Stop 421-DM 800 Bashner Road Missoula, Mont. 54121

--- muzak@ssc.desi.arpa
...
same for second author
...
same for third author

---

Notes:
  1) The city and state in the Address Field will be used as a primary navigation scheme (location navigation).
  2) The Authors Field and Address Field are a matched pair. A pair is present for each author. The Authors Field is perpetually static, however a contributing author may request that his or her address fields be updated to reflect changes in institutional affiliation or location.
  Date In Field:
  Gives the date the component was contributed to the system. Example:
    Feb. 1, 1993
  Requests Field:
  Gives the number of requests made for the component since its contribution. Example:267
  Note:
  The Date In and Requests fields taken together form an informal but democratic method of rating software. Derivative information might be valuable here, showing popularity as a function of time.
  Inputs Field: ▲
  Lists inputs and their types, if applicable, to the component. The inputs should be declared as they would in the native language definition of the component. Example: Vec3 a,b;
  Outputs Field: ▲
  Lists outputs from the component, including pointers in the input argument list that are touched by the component during its operation. Example:

extern Float dot_Vec3 ( );

Entry Points Field:

Lists names and calling interfaces of components with multiple entry points such as abstract data types or object types.

Exit Paths Field:

Lists information about multiple exit paths, if applicable.

Exceptions:

Lists exceptions states, error flags, and error conditions capable of being triggered during operation of the component. Example:

ZERO_LENGTH_VECTOR
HUGE_COMPONENT_OVERFLOW

What Is Plate:

This plate contains an illustration indicating what the software component is, what it does or what it is used for.

Call Plate:

The Call Plate shows a generic calling sequence as it would appear in a user program or source declaration. Its purpose is to convey code-like usage and typing information sufficient for use in a textual cut and-paste environment.

Part Plate:

The Part Plate is visual analog of the calling sequence for a dataflow programming paradigm. It shows the software component or part, its inputs and output arcs, and the typing, if applicable that binds to the I/O arcs. Instance names are not annotated to the dataflow diagram since they are not necessary at the user level. (Do plumbers name their pipes Mary or Fred?) Type names are affixed to the arcs since it is (or should be) illegal to join dissimilar data streams without a coupler. The purpose of the Part Plate is to convey code-like usage and typing information adequate for use in a graphical cut and-paste environment.

Doc Plate:

The Doc Plate contains a summary explanation of what the component is, does, or is used for. It is the textual analog of any visual material in the What It Is Plate. This analogy should be enforced when components are added so that this dualism is evident to the user. Newer versions of the Doc Plate will contain a "more" button for more textual detail. Similarly the What Is Plate might animate when clicked or struck, providing additional graphical detail.

Button Requirements:

Read Me Button:

Enables access to the mandatory Read Me documentation file in ASCII text format.

Perform Button:

Provides access to any performance data & benchmarks.

Reference Button:

Provides access to any technical references providing theoretical, science, or engineering information about the component.

Depends On Button:

For the 'C' language would provides access to the include files required for this component to compile, link, or run. For other languages would convey what this component depends on environmentally or definitionally to operate.

Left Sibling Button:

Accesses the component card for the left sibling when pressed from the component viewing level.

Up to Parent Button:

Accesses the view of the ensemble of components when pressed from the component viewing level.

Right Sibling Button:

Accesses the component card for the right sibling when pressed from the component viewing level.

While the invention has been described in detail with specific reference to preferred embodiments thereof, it is understood that variations and modifications thereof may be made without departing from the true spirit and scope of the invention.

What is claimed is:

1. A method of facilitating intelligent browsing through a collection of reusable software components using a computer having a video monitor and user input means such as a keyboard or a mouse for transmitting user selections to said computer, said method comprising:

presenting on said monitor a picture of encyclopedia volumes with respective visible labels referring to types of software, in accordance with a metaphor in which each volume includes a page having a list of general topics under the software type of said volume and pages having lists of software components for each one of said general topics;

altering said picture to open one of said volumes in response to an initial user selection specifying said one volume to display on said monitor a picture of the page thereof having said list of general topics and altering said picture to display the page thereof having a list of software components under one of said general topics in response to a next user selection specifying said one general topic; and presenting on said monitor a picture of a set of different informative plate means for depicting different types of information about one of said software components in response to a further user selection specifying said one component, wherein the set of different informative plate means comprises, a first plate comprising a graphic display illustrating the operation of said one software component;

a second plate comprising a set of software language statements comprising said software component;

a third plate comprising a text statement describing in detail what said software component is, what said software component does, and what said software component is used for.

2. The method of claim 1 further comprising:

fetching one of said software components for incorporation into a software program under development in response to a final user selection requesting said one software component.

3. The method of claim 1 wherein the step of presenting a picture of said informative plate means comprises displaying plural informative plates simultaneously, each of said informative plates being a separate display area on said monitor.

4. The method of claim 1 wherein said plates further comprise:

a fourth plate in which an animated illustration of the operation of said software component is shown.

5. The method of claim 1 further comprising adding additional plates of information to the picture displayed on said monitor in response to a user selection requesting said additional plates.

6. The method of claim 1 wherein said initial selection is made by said user moving a cursor in said picture to overlie said one volume in said set of encyclopedia volumes.

7. The method of claim 1 wherein said next selection is made by said user moving a cursor in said picture to overlie said one general topic in said list of general topics.

8. The method of claim 1 wherein said further selection is made by said user moving a cursor in said picture to overlie said one software component in said list of software components.

9. The method of claim 1 further comprising displaying on a portion of said monitor a navigation tool depicting prior user selections of encyclopedia volumes, general topics and software components.

10. The method of claim 9 wherein said navigation tool comprises a picture of a set of linearly sequential symbols representing a temporal history of each of said prior user selections.

11. The method of claim 1 further comprising:

displaying on said monitor a list of software attributes in response to a user selection of a searcher means; and, displaying on said monitor a list of software components relative to a certain set of software attributes in response to a user selection specifying said certain set of software attributes from said list of software attributes.

12. The method of claim 11 further comprising displaying on said monitor a set of informative plate means representing one of said software components in response to a user selection specifying one of said software components on said list.

13. The method of claim 1 further comprising accepting a reusable software component from said user for incorporation into said collection, whereby to build said collection from submissions from plural users.

14. Apparatus for facilitating intelligent browsing through a collection of reusable software components using a computer having a video monitor and user input means such as a keyboard or a mouse for transmitting user selections to said computer, said apparatus comprising:

means for presenting on said monitor a picture of encyclopedia volumes with respective visible labels referring to types of software, in accordance with a metaphor in which each volume includes a page having a list of general topics under the software type of said volume and pages having lists of software components for each one of said general topics;

means for altering said picture to open one of said volumes in response to an initial user selection specifying said one volume to display on said monitor a picture of the page thereof having said list of general topics and altering said picture to display the page thereof having a list of software components under one of said general topics in response to a next user selection specifying said one general topic; and means for presenting on said monitor a picture of a set of different informative plate means for depicting different types of information about one of said software components in response to a further user selection specifying said one component, wherein the set of different informative plate means comprises, a first plate comprising a graphic display illustrating the operation of said one software component;

a second plate comprising a set of software language statements comprising said software component;

a third plate comprising a text statement describing in detail what said software component is, what said software component does, and what said software component is used for.

15. The apparatus of claim 14 further comprising:

means for fetching one of said software components for incorporation into a software program under development in response to a final user selection requesting said one software component.

16. The apparatus of claim 14 wherein the means for presenting a picture of said informative plate means comprises means for displaying plural informative plates simultaneously, each of said informative plates being a separate display area on said monitor.

17. The apparatus of claim 14 wherein said plates further comprise:

a fourth plate in which an animated illustration of the operation of said software component is shown.

18. The apparatus of claim 14 further comprising means for adding additional plates of information to the picture displayed on said monitor in response to a user selection requesting said additional plates.

19. The apparatus of claim 14 wherein said initial selection is made by said user moving a cursor in said picture to overlie said one volume in said set of encyclopedia volumes.

20. The apparatus of claim 14 wherein said next selection is made by said user moving a cursor in said picture to overlie said one general topic in said list of general topics.

21. The apparatus of claim 14 wherein said further selection is made by said user moving a cursor in said picture to overlie said one software component in said list of software components.

22. The apparatus of claim 14 further comprising means for displaying on a portion of said monitor a navigation tool depicting prior user selections of encyclopedia volumes, general topics and software components.

23. The apparatus of claim 22 wherein said navigation tool comprises a picture of a set of linearly sequential symbols representing a temporal history of each of said prior user selections.

24. The apparatus of claim 14 further comprising:

means for displaying on said monitor a list of software attributes in response to a user selection of a searcher means; and, means for displaying on said monitor a list of software components relative to a certain set of software attributes in response to a user selection specifying said certain set of software attributes from said list of software attributes.

25. The apparatus of claim 24 further comprising means for displaying on said monitor said set of informative plate means representing one of said software components in response to a user selection specifying one of said software components on said list.

26. The apparatus of claim 14 further comprising means for accepting a reusable software component from said user for incorporation into said collection, whereby to build said collection from submissions from plural users.

* * * * *